(12) United States Patent
Kamiya et al.

(10) Patent No.: US 7,224,507 B2
(45) Date of Patent: May 29, 2007

(54) OPTICAL DEFLECTOR (75) Inventors: Yoshitaka Kamiya, Hachioji (JP);
Daisuke Matsuo, Hachioji (JP);
Hiroshi Miyajima, Hachioji (JP);
Masahiro Nishio, Hachioji (JP)

(73) Assignee: Olympus Corporation, Tokyo (JP)

( * ) Notice: Subject to any disclaimer, the term of this patent is extended or adjusted under 35 U.S.C. 154(b) by 46 days.

(21) Appl. No.: 11/003,286

(22) Filed: Dec. 3, 2004

(65) Prior Publication Data
US 2005/0122602 A1 Jun. 9, 2005

(30) Foreign Application Priority Data

Dec. 4, 2003 (JP) ............................. 2003-405786
Nov. 12, 2004 (JP) ............................. 2004-328814

(51) Int. Cl.
G02B 26/00 (2006.01)
(52) U.S. Cl. ................... 359/290; 359/291; 359/872; 359/226; 359/212
(58) Field of Classification Search ................. 359/290
See application file for complete search history.

(56) References Cited

U.S. PATENT DOCUMENTS

| | | | | |
|---|---|---|---|---|
| 6,044,705 A * | 4/2000 | Neukermans et al. .... | 73/504.02 |
| 6,134,042 A * | 10/2000 | Dhuler et al. ................ | 359/224 |
| 6,388,789 B1 | 5/2002 | Bernstein .................... | 359/198 |
| 6,404,313 B2 | 6/2002 | Asada ......................... | 335/222 |
| 6,556,333 B2 * | 4/2003 | Tokuda et al. ............... | 359/224 |
| 6,765,706 B2 * | 7/2004 | Tokuda et al. ............... | 359/220 |
| 6,897,990 B2 * | 5/2005 | Yagi et al. ................... | 359/224 |
| 2001/0052834 A1 | 12/2001 | Asada ......................... | 335/220 |
| 2002/0050744 A1 | 5/2002 | Bernstein et al. ............. | 310/12 |
| 2002/0149294 A1 | 10/2002 | Matsumoto et al. ......... | 310/309 |

FOREIGN PATENT DOCUMENTS

EP 1 251 382 A1 10/2002
JP 2004-266957 9/2004

* cited by examiner

Primary Examiner—Jordan Schwartz
Assistant Examiner—Jessica Stultz
(74) Attorney, Agent, or Firm—Scully, Scott, Murphy & Presser, P.C.

(57) ABSTRACT

An optical deflector includes a magnet unit and a movable plate unit. The movable plate unit has an inner movable plate having a reflecting surface, an outer movable plate, two inner torsion bars connecting the inner and outer movable plates, a support located outside the outer movable plate, and two outer torsion bars connecting the outer movable plate and support. The movable plate unit has two inner wirings, each of which has an inner drive wiring portion that extends along by a periphery of the inner movable plate and two inner extracted wiring portions extending from two ends of the inner drive wiring portion. The two inner drive wiring portions are located substantially line-symmetrically with respect to the first axis. The two inner extracted wiring portions are located substantially line-symmetrically with respect to the second axis. Currents of the same direction are applied to the two inner drive wiring portions.

11 Claims, 7 Drawing Sheets

OPTICAL DEFLECTOR

CROSS-REFERENCE TO RELATED APPLICATIONS

This application is based upon and claims the benefit of priority from prior Japanese Patent Applications No. 2003-405786, filed Dec. 4, 2003; and No. 2004-328814, filed Nov. 12, 2004, the entire contents of both of which are incorporated herein by reference.

BACKGROUND OF THE INVENTION

1. Field of the Invention

The present invention relates to an electromagnetically actuated two-dimensional optical deflector.

2. Description of the Related Art

Recently, attention has been paid to an optical deflector manufactured by using a micromachining technique based on a semiconductor manufacturing technique.

Figure 15:
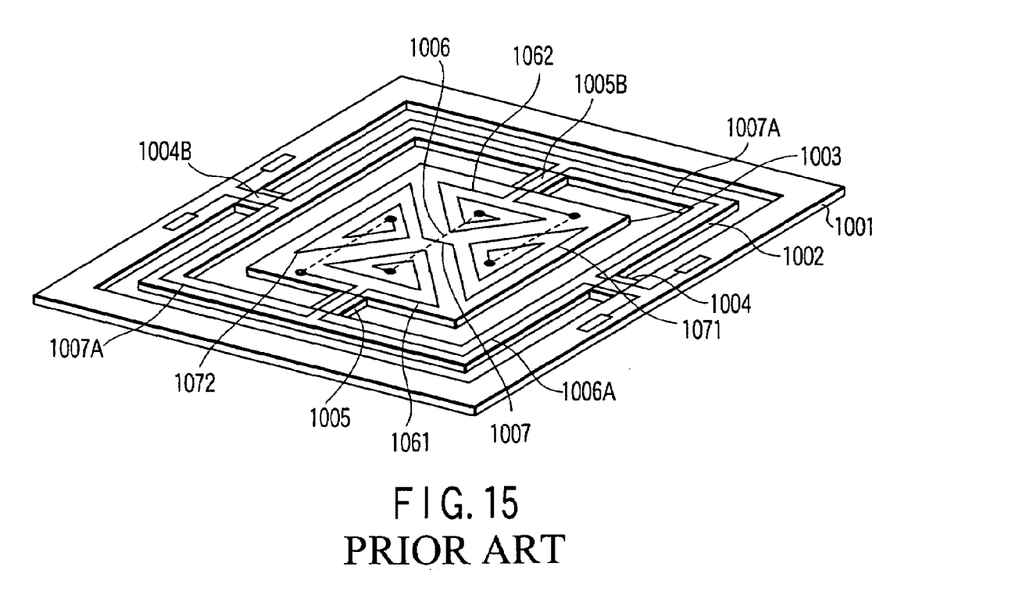
FIG. 15 is a perspective view of the main part of the optical deflector disclosed in U.S. Pat. No. 6,388,789.
Figure 16:
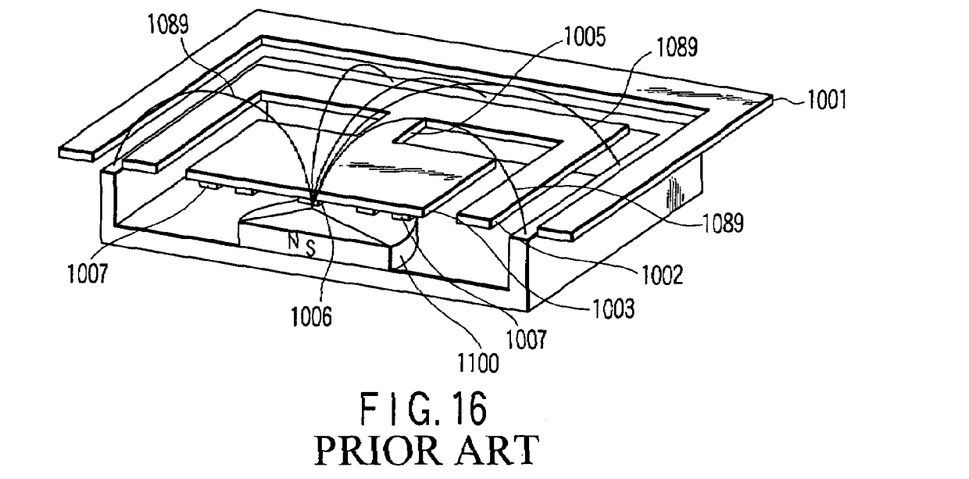
FIG. 16 is a sectional perspective view of the optical deflector disclosed in U.S. Pat. No. 6,388,789.

The specification of U.S. Pat. No. 6,388,789 discloses, as such an optical deflector, an electromagnetically actuated two-dimensional optical deflector. FIG. 15 is a perspective view of the main part of the optical deflector disclosed in U.S. Pat. No. 6,388,789. FIG. 16 is a sectional perspective view of the optical deflector disclosed in U.S. Pat. No. 6,388,789.

As shown in FIG. 15, this two-dimensional optical deflector includes a first rotating portion 1002, which can rock about the first rotation axis with respect to a support 1001, and a second rotating portion 1003, which can rock about the second rotation axis with respect to the first rotating portion 1002. The second rotating portion 1003 has a reflecting surface for reflecting light. The support 1001 and first rotating portion 1002 are coupled to each other through a pair of hinges 1004 and 1004B extending along the first rotation axis. The first rotating portion 1002 and second rotating portion 1003 are coupled to each other through a pair of hinges 1005 and 1005B extending along the second rotation axis.

A pair of first coils 1061 and 1062 for enabling rocking about the first rotation axis and a pair of second coils 1071 and 1072 for enabling rocking about the second rotation axis are formed on the second rotating portion 1003. The first coils 1061 and 1062 are connected to each other through a wiring 1006. The second coils 1071 and 1072 are connected to each other through a wiring 1007. Two wirings 1006A for supplying power to the first coils 1061 and 1062 extend on the pair of hinges 1004 and 1004B, respectively, via the first rotating portion 1002. Likewise, two wirings 1007A for supplying power to the second coils 1071 and 1072 extend on the pair of hinges 1004 and 1004B, respectively, via the first rotating portion 1002.

As shown in FIG. 16, a magnet 1100 is placed below the second rotating portion 1003. The magnet 1100 generates a magnetic field 1089 radially spreading from the center of the second rotating portion 1003 to the support 1001. The second rotating portion 1003 is rocked about the first rotation axis by the interaction between the currents flowing in the first coils 1061 and 1062 and the magnetic field 1089, and also about the second rotation axis by the interaction between the currents flowing in the second coils 1071 and 1072 and the magnetic field 1089.

Figure 17:
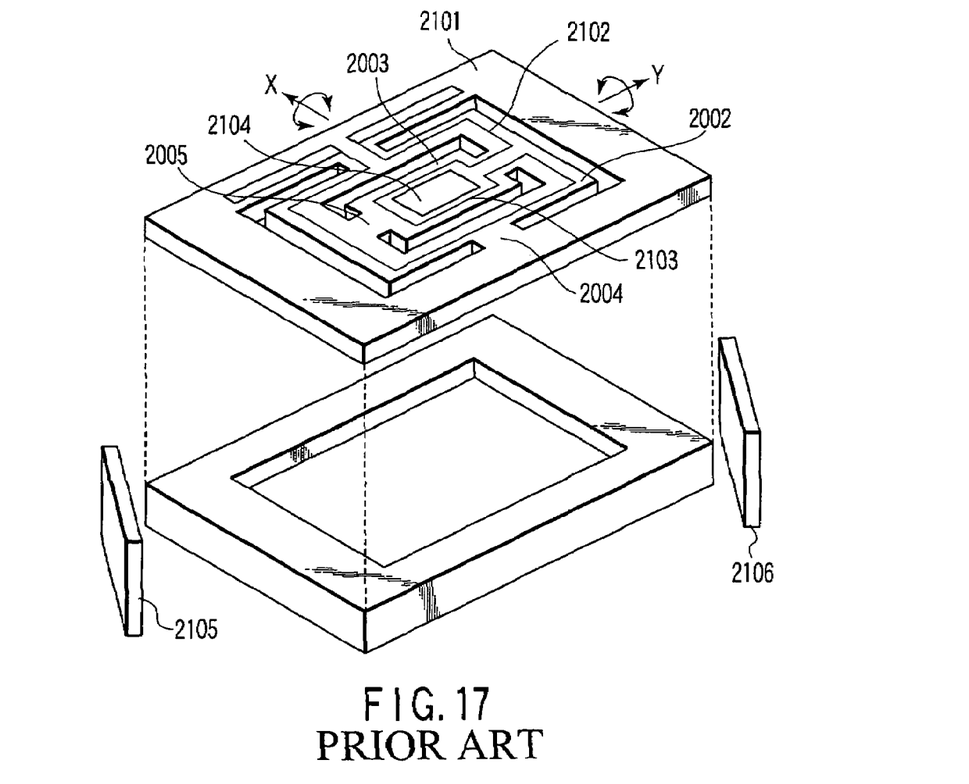
FIG. 17 is an exploded perspective view of the optical deflector disclosed in U.S. Pat. No. 6,404,313.

U.S. Pat. No. 6,404,313 discloses another electromagnetically actuated two-dimensional optical deflector. FIG. 17 is an exploded perspective view of the optical deflector disclosed in U.S. Pat. No. 6,404,313.

As shown in FIG. 17, this two-dimensional optical deflector includes an outer movable plate 2002 located inside a support 2001, an inner movable plate 2003 located inside the outer movable plate 2002, a first torsion bar 2004 supporting the support 2001 so as to allow it to rock about the X-axis with respect to the outer movable plate 2002, and a second torsion bar 2005 supporting the inner movable plate 2003 so as to allow it to rock about the Y-axis with respect to the outer movable plate 2002. The inner movable plate 2003 has a reflecting surface 2104 for reflecting light.

A first driving coil 2102 with a single turn extends on the outer movable plate 2002. A second driving coil 2103 with a single turn extends near a peripheral portion on the inner movable plate 2003. The first driving coil 2102 is connected to the second driving coil 2103.

A pair of magnets 2105 and 2106 are arranged along a diagonal line outside this structure. The magnetic field generated by the magnets 2105 and 2106 exists on one of the diagonal lines. The inner movable plate 2003 is rocked about the X-axis by the interaction between the current flowing in the first driving coil 2102 and the magnetic field, and to rock about the Y-axis by the interaction between the current flowing in the second driving coil 2103 and the magnetic field.

BRIEF SUMMARY OF THE INVENTION

An optical deflector according to the present invention includes a magnet unit, which generates a magnetic field, and a movable plate unit, which is placed in the magnetic field. The movable plate unit has an inner movable plate having a reflecting surface, an outer movable plate located outside the inner movable plate, two inner torsion bars connecting the inner movable plate and the outer movable plate, a support located outside the outer movable plate, and two outer torsion bars connecting the outer movable plate and the support. The inner torsion bars extend along a first axis and are capable of twisting about the first axis so as to allow the inner movable plate to tilt about the first axis with respect to the outer movable plate. The outer torsion bars extend along a second axis perpendicular to the first axis and are capable of twisting about the second axis so as to allow the outer movable plate to tilt about the second axis with respect to the support. The movable plate unit further has two inner wirings extending on the inner movable plate, the inner torsion bars, the outer movable plate, the outer torsion bars, and the support. One of the inner wirings passes through one of the outer torsion bars. The other of the inner wirings passes through the other of the outer torsion bars. Each of the two inner wirings has an inner drive wiring portion that extends along by a periphery of the inner movable plate, and two inner extracted wiring portions extending from two ends of the inner drive wiring portion. The two inner drive wiring portions are located substantially line-symmetrically with respect to the first axis. The two inner extracted wiring portions extending from the two ends of each of the inner drive wiring portions are located substantially line-symmetrically with respect to the second axis. Currents of the same direction are applied to the two inner drive wiring portions.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the present invention.

DETAILED DESCRIPTION OF THE INVENTION

The embodiments of the present invention will be described below with reference to the views of the accompanying drawing.

First Embodiment

Figure 1:
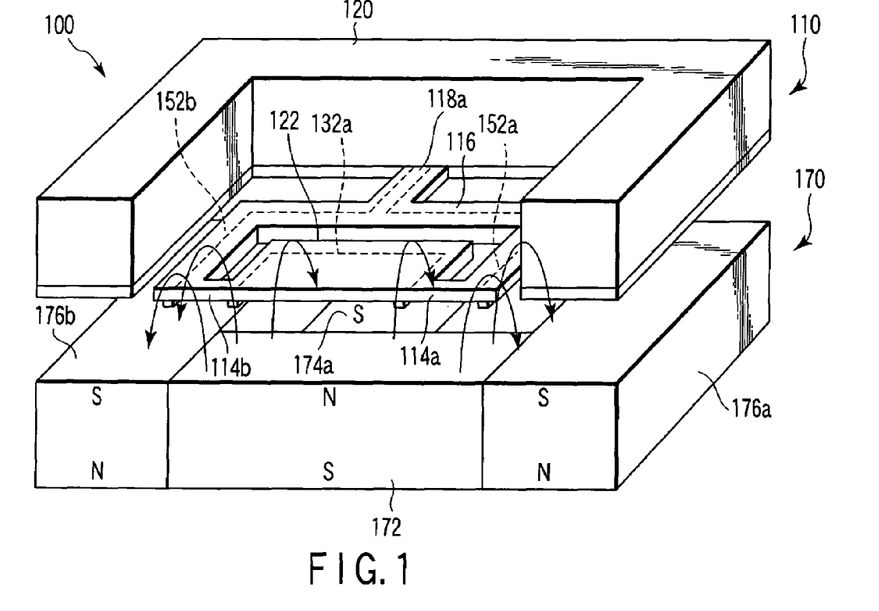
FIG. 1 is a sectional perspective view of an optical deflector according to the first embodiment of the present invention.
Figure 2:
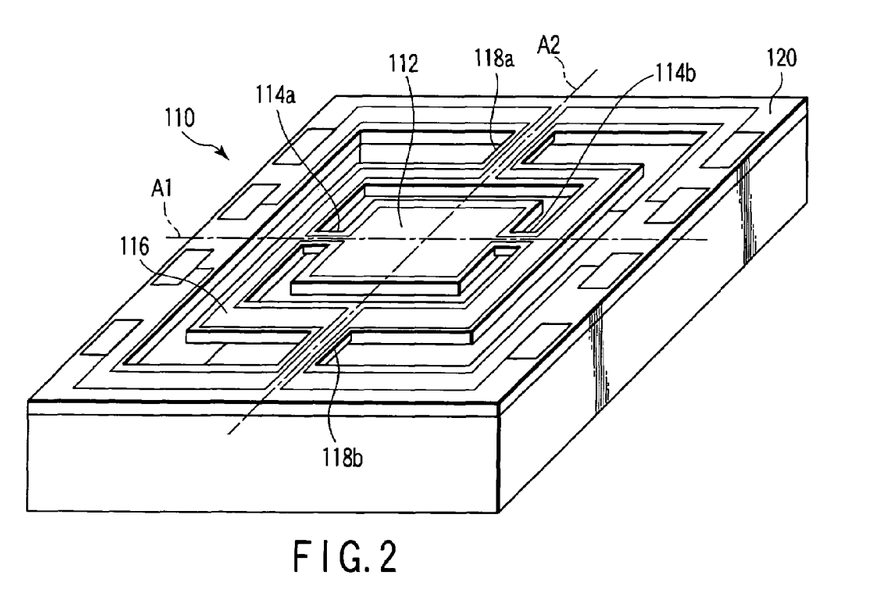
FIG. 2 is a perspective view of the movable plate unit shown in FIG. 1.
Figure 3:
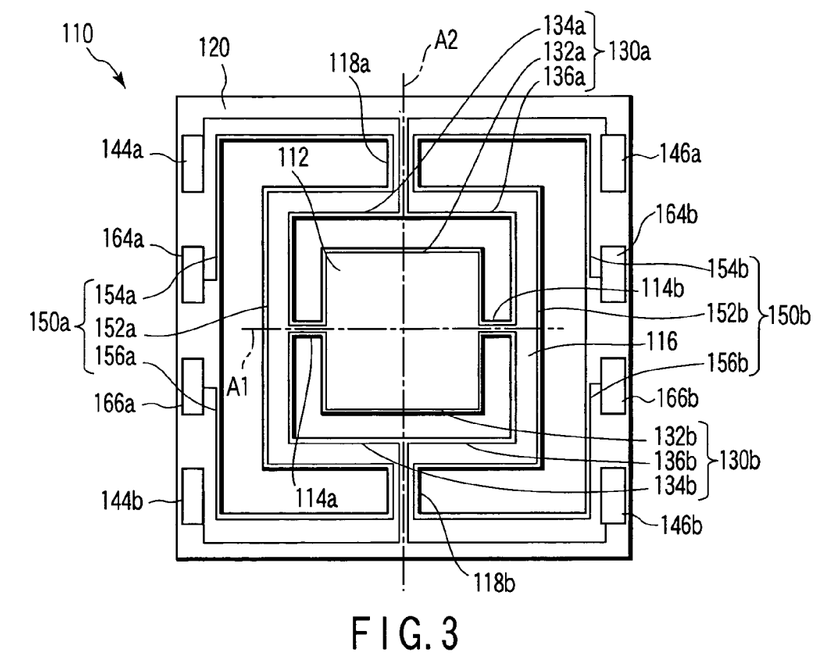
FIG. 3 is a plan view of the movable plate unit shown in FIG. 2.
Figure 4:
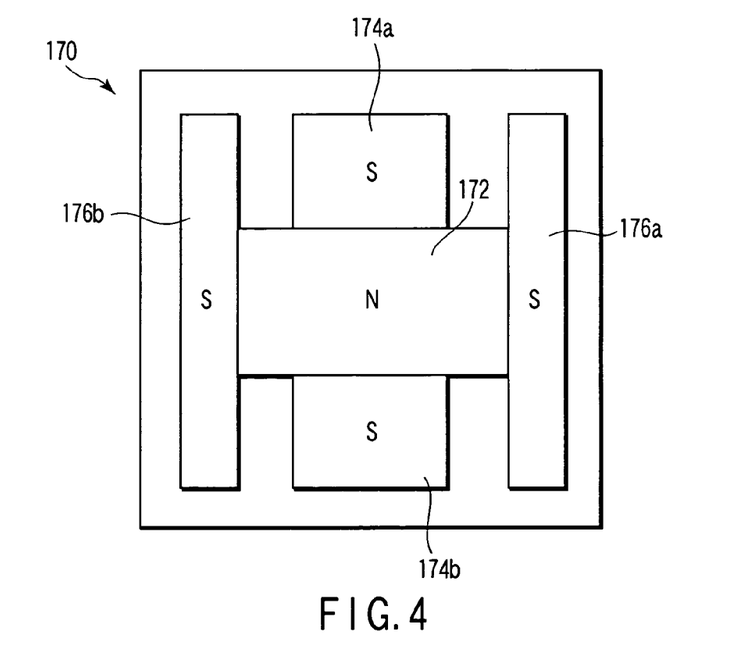
FIG. 4 is a plan view of the magnet unit shown in FIG. 1.

FIG. 1 is a sectional perspective view of an optical deflector according to the first embodiment of the present invention. FIG. 2 is a perspective view of a movable plate unit shown in FIG. 1. The movable plate unit shown in FIG. 2 is an upside down view of that shown in FIG. 1. FIG. 3 is a plan view of the movable plate unit shown in FIG. 2. FIG. 4 is a plan view of a magnet unit shown in FIG. 1.

As shown in FIG. 1, a two-dimensional optical deflector 100 includes a magnet unit 170, which generates a magnetic field, and a movable plate unit 110 placed in the magnetic field generated by the magnet unit 170. The movable plate unit 110 and magnet unit 170 are arranged at a predetermined interval.

As shown in FIGS. 2 and 3, the movable plate unit 110 includes an inner movable plate 112 in the form of a rectangular plate, an outer movable plate 116 in the form of a rectangular frame located outside the inner movable plate 112, two inner torsion bars (first inner torsion bar 114a and second inner torsion bar 114b) connecting the inner movable plate 112 and the outer movable plate 116, a support 120 in the form of a rectangular plate located outside the outer movable plate 116, and two outer torsion bars (first outer torsion bar 118a and second outer torsion bar 118b) connecting the outer movable plate 116 and the support 120.

Although the outer movable plate 116 is in the form of a frame surrounding the inner movable plate 112, the form of the outer movable plate 116 is not specifically limited to this. Although the support 120 is in the form of a frame surrounding the outer movable plate 116, the form of the support 120 is not limited to this, and may have another shape such as a U shape. In addition, the support 120 is formed from one member, but may be formed from two members that are spaced apart from each other.

As shown in FIG. 1, the inner movable plate 112 has, on its upper surface, a reflecting surface 122 for reflecting light. The reflecting surface 122 is formed from, for example, a thin gold (Au) film. In this case, the upper surface of the inner movable plate 112 is one of the two largest parallel flat surfaces. Referring to FIG. 1, the upper surface is the one seen and located on the upper side. In addition, referring to FIG. 1, the surface that is located on the lower side and is hidden from the eye will be referred to as a lower surface.

As shown in FIGS. 2 and 3, the two inner torsion bars 114a and 114b extend on an almost straight line along a first axis A1. The two outer torsion bars 118a and 118b also extend on an almost straight line along a second axis A2. The first and second axes A1 and A2 are almost perpendicular to each other.

The outer peripheral shape of the inner movable plate 112 is rectangular when viewed from above, and two central axes of the rectangle (two axes that pass through the center of the rectangle and are perpendicular to sides of the rectangle), which are perpendicular to each other, are parallel to the first axis A1 and second axis A2, respectively. The outer peripheral shape of the outer movable plate 116 is rectangular when viewed from above, and two central axes of the rectangle (two axes that pass through the center of the rectangle and are perpendicular to sides of the rectangle), which are perpendicular to each other, are also parallel to the first axis A1 and second axis A2.

The outer torsion bars 118a and 118b are capable of twisting about the second axis A2 and allow the outer movable plate 116 to tilt about the second axis A2 with respect to the support 120. The inner torsion bars 114a and 114b are capable of twisting about the second axis and allow the inner movable plate 112 to rock about the first axis A1 with respect to the outer movable plate 116.

Consequently, the direction of the reflecting surface 122 of the inner movable plate 112 is allowed to be two-dimensionally changed, so that the two-dimensional optical deflector 100 allows a beam of light reflected by the reflecting surface 122 to be deflected.

The movable plate unit 110 is formed from a silicon substrate by using a kind of semiconductor fabrication process. The inner movable plate 112 and outer movable plate 116 are formed from, for example, thin silicon plates obtained by processing a silicon substrate. The inner torsion bars 114a and 114b and outer torsion bars 118a and 118b are formed from, for example, a thin silicon film or thin polyimide film. The material to be used for the inner movable plate 112, outer movable plate 116, support 120, inner torsion bars 114a and 114b, and outer torsion bars 118a and 118b may include poly silicon, silicon nitride, an organic material, a metal material, and the like in addition to silicon and polyimide.

As shown in FIG. 3, the movable plate unit 110 further includes two inner wirings (first inner wiring 130a and second inner wiring 130b) extending on the inner movable plate 112, inner torsion bars 114a and 114b, outer movable plate 116, outer torsion bars 118a and 118b, and support 120. The first inner wiring 130a includes a first inner drive wiring portion 132a and two first inner extracted wiring portions 134a and 136a respectively extending from the two ends of the first inner drive wiring portion 132a. Likewise, the second inner wiring 130b includes a second inner drive wiring portion 132b and two second inner extracted wiring portions 134b and 136b respectively extending from the two ends of the second inner drive wiring portion 132b.

In this case, the inner drive wiring portions 132a and 132b are parts of the inner wirings 130a and 130b that actually contribute to the actuation of the inner movable plate 112 and extend parallel to the first axis A1 along by a periphery of the inner movable plate 112. The first inner extracted wiring portions 134a and 136a are parts of the first inner wiring 130a that exclude the first inner drive wiring portion 132a. Likewise, the second inner extracted wiring portions 134b and 136b are parts of the second inner wiring 130b that exclude the second inner drive wiring portion 132b.

As is obvious from FIG. 3, the first inner drive wiring portion 132a and second inner drive wiring portion 132b are located almost line-symmetrically with respect to the first axis A1.

Referring to FIG. 3, the first inner extracted wiring portion 134a extending from the left end portion of the first inner drive wiring portion 132a on the upper side extends downward along by the periphery of the inner movable plate 112, passes through the first inner torsion bar 114a on the left side, extends upward along by the inner periphery of the outer movable plate 116, passes through the first outer torsion bar 118a on the upper side, extends to the left on the support 120, and terminates at an electrode pad 144a provided on the support 120.

The first inner extracted wiring portion 136a extending from the right end portion of the first inner drive wiring portion 132a extends downward along by the periphery of the inner movable plate 112, passes through the second inner torsion bar 114b on the right side, extends upward along by the periphery of the outer movable plate 116, passes through the first outer torsion bar 118a on the upper side, extends to the right on the support 120, and terminates at an electrode pad 146a provided on the support 120.

As is obvious from FIG. 3, the first inner extracted wiring portion 134a and first inner extracted wiring portion 136a are located almost line-symmetrically with respect to the first axis A1.

The second inner extracted wiring portion 134b extending from the left end portion of the second inner drive wiring portion 132b on the lower side extends upward along by the periphery of the inner movable plate 112, passes through the first inner torsion bar 114a on the left side, extends downward along by the periphery of the outer movable plate 116, passes through the second outer torsion bar 118b on the lower side, extends to the left on the support 120, and terminates at an electrode pad 144b provided on the support 120.

The second inner extracted wiring portion 136b extending from the right end portion of the second inner drive wiring portion 132b extends upward along by the periphery of the inner movable plate 112, passes through a second inner torsion bar 114b on the right side, extends downward along by the inner periphery of the outer movable plate 116, passes through the second outer torsion bar 118b on the lower side, extends to the right on the support 120, and terminates at an electrode pad 146b provided on the support 120.

As is obvious from FIG. 3, the second inner extracted wiring portion 134b and second inner extracted wiring portion 136b are located almost line-symmetrically with respect to the second axis A2.

The movable plate unit 110 further includes two outer wirings (first outer wiring 150a and second outer wiring 150b) extending on the outer movable plate 116, outer torsion bars 118a and 118b, and support 120. The first outer wiring 150a includes a first outer drive wiring portion 152a and two first outer extracted wiring portions 154a and 156a respectively extending from the two ends of the first outer drive wiring portion 152a. Likewise, the second outer wiring 150b includes a second outer drive wiring portion 152b and two second outer extracted wiring portions 154b and 156b respectively extending from the two ends of the second outer drive wiring portion 152b.

In this case, the outer drive wiring portions 152a and 152b are respectively parts of the outer wirings 150a and 150b that actually contribute to the actuation of the outer movable plate 116 and extend parallel to the second axis A2 along by a periphery of the outer movable plate 116. The first outer extracted wiring portions 154a and 156a are parts of the first outer wiring 150a that exclude the first outer drive wiring portion 152a. Likewise, the second outer extracted wiring portions 154b and 156b are parts of the second outer wiring 150b that exclude the second outer drive wiring portion 152b.

As is obvious from FIG. 3, the first outer drive wiring portion 152a and second outer drive wiring portion 152b are located almost line-symmetrically with respect to the second axis A2.

Referring to FIG. 3, the first outer extracted wiring portion 154a extending from the upper end portion of the first outer drive wiring portion 152a on the left side extends to the right along by the outer periphery of the outer movable plate 116, passes through the first outer torsion bar 118a on the upper side, extends to the left on the support 120, and terminates at an electrode pad 164a provided on the support 120.

The first outer extracted wiring portion 156a extending from the lower end portion of the first outer drive wiring portion 152a extends to the right along by the outer periphery of the outer movable plate 116, passes through the second outer torsion bar 118b on the lower side, extends to the left on the support 120, and terminates at an electrode pad 166a provided on the support 120.

As is obvious from FIG. 3, the first outer extracted wiring portion 154a and first outer extracted wiring portion 156a are located almost line-symmetrically with respect to the first axis A1.

The second outer extracted wiring portion 154b extending from the upper end portion of the second outer drive wiring portion 152b on the right side extends to the left along by the outer periphery of the outer movable plate 116, passes through the first outer torsion bar 118a on the upper side, extends to the right on the support 120, and terminates at an electrode pad 164b provided on the support 120.

The second outer extracted wiring portion 156b extending from the lower end portion of the second outer drive wiring portion 152b extends to the left along by the outer periphery of the outer movable plate 116, passes through the second outer torsion bar 118b on the lower side, extends to the right on the support 120, and terminates at an electrode pad 166b provided on the support 120.

As is obvious from FIG. 3, the second outer extracted wiring portion 154b and second outer extracted wiring portion 156b are located almost line-symmetrically with respect to the first axis A1.

Although not specifically shown, the wirings 130a, 130b, 150a, and 150b are preferably covered with isolation film such as silicon oxide film for electric isolation.

The wirings 130a, 130b, 150a, and 150b and the electrode pads 144a, 144b, 146a, 146b, 164a, 164b, 166a, and 166b are formed from aluminum by using, for example, a kind of semiconductor fabrication process.

For example, the wirings 130a, 130b, 150a, and 150b and the electrode pads 144a, 144b, 146a, 146b, 164a, 164b, 166a, and 166b are formed by forming an aluminum film on the surface of a structure including the inner movable plate 112, outer movable plate 116, support 120, inner torsion bars 114a and 114b, and outer torsion bars 118a and 118b formed from a silicon substrate using a kind of semiconductor fabrication process as described above, and by patterning the film.

The material to be used for the wirings 130a, 130b, 150a, and 150b and the electrode pads 144a, 144b, 146a, 146b, 164a, 164b, 166a, and 166b may be copper or gold (Au) instead of aluminum, preferably a metal having a low resistivity.

As shown in FIG. 4, a magnet unit 170 includes a magnet 172 located at the center, two magnets 174a and 174b located on the two sides of the magnet 172 along the first axis A1, and two magnets 176a and 176b located on the two sides of the magnet 172 along the second axis A2. The magnet 172 has an N pole on the side facing the movable plate unit 110. The magnets 174a and 174b and the magnets 176a and 176b each have an S pole on the side facing the movable plate unit 110. That is, the two adjacent magnets are opposite in magnetic polarity direction. The magnets, 172, 174a, 174b, 176a, and 176b each have a rectangular parallelepiped shape, and are fixed to each other with an adhesive.

As shown in FIG. 1, the movable plate unit 110 and magnet unit 170 are arranged at a predetermined interval. The inner drive wiring portions 132a and 132b extend almost parallel to the boundaries between the magnet 172 and the magnets 174a and 174b. Although the second inner drive wiring portion 132b is not shown in FIG. 1, the positional relationship with the second inner drive wiring portion 132b can easily be understood by referring to FIGS. 3 and 4. The outer drive wiring portions 152a and 152b extend almost parallel to the boundaries between the magnet 172 and the magnets 176a and 176b.

The first inner drive wiring portion 132a is located almost immediately above the boundary between the magnet 172 and the magnet 174a. The second inner drive wiring portion 132b is located almost immediately above the boundary between the magnet 172 and the magnet 174b. The first outer drive wiring portion 152a is located almost immediately above the boundary between the magnet 172 and the magnet 176a. The second outer drive wiring portion 152b is located almost immediately above the boundary between the magnet 172 and the magnet 176b. In this case, "immediately above" indicates a direction that is perpendicular to both the first and second axes A1 and A2 and extends from the magnet unit 170 to the movable plate unit 110.

In this arrangement relationship, the magnetic flux density near the boundary between two adjacent magnets with opposite magnetic polarity directions is high. That is, the first inner drive wiring portion 132a is located in a region where the magnetic flux density is high. The second inner drive wiring portion 132b is located in a region where the magnetic flux density is high. Likewise, the first outer drive wiring portion 152a is located in a region where the magnetic flux density is high. The second outer drive wiring portion 152b is located in a region where the magnetic flux density is high.

As shown in FIG. 1, magnetic lines of force flowing from the magnet 172 to the magnet 174a are almost perpendicular to the boundary between the magnet 172 and the magnet 174a, and hence cross the first inner drive wiring portion 132a at almost right angles. Likewise, magnetic lines of force flowing from the magnet 172 to the magnet 174b are almost perpendicular to the boundary between the magnet 172 and the magnet 174b, and hence cross the second inner drive wiring portion 132b at almost right angles. Magnetic lines of force flowing from the magnet 172 to the magnet 176a are almost perpendicular to the boundary between the magnet 172 and the magnet 176a, and hence cross the first outer drive wiring portion 152a at almost right angles. Likewise, magnetic lines of force flowing from the magnet 172 to the magnet 176b are almost perpendicular to the boundary between the magnet 172 and the magnet 176b, and hence cross the second outer drive wiring portion 152b at almost right angles.

The operation of the above optical deflector will be described next.

For example, a drive power supply (not shown) is used to apply a voltage between the electrode pad 164a and the electrode pad 166a to cause a current to flow from the electrode pad 164a to the electrode pad 166a. In addition, the same voltage is applied between the electrode pad 164b and the electrode pad 166b to cause the same current to flow from the electrode pad 164b to the electrode pad 166b.

Referring to FIG. 3, a downward current flows in the first outer drive wiring portion 152a on the outer movable plate 116. The first outer drive wiring portion 152a is located in outward (leftward) magnetic lines of force, and hence receives the downward Lorentz force in a direction perpendicular to the drawing surface.

Referring to FIG. 3, a downward current flows in the second outer drive wiring portion 152b on the outer movable plate 116. The second outer drive wiring portion 152b is located in outward (rightward) magnetic lines of force, and hence receives the upward Lorentz force in the direction perpendicular to the drawing surface.

The outer movable plate 116 therefore receives a couple of forces about the second axis A2, and the outer torsion bars 118a and 118b twist. This causes the outer movable plate 116 to tilt about the second axis A2. As a consequence, the inner movable plate 112 tilts about the second axis A2 together with the outer movable plate 116. The tilt angle of the outer movable plate 116 depends on the magnitudes of the currents flowing in the outer drive wiring portions 152a and 152b.

For example, a drive power supply (not shown) is used to apply a voltage between the electrode pad 144a and the electrode pad 146*a* to cause a current to flow from the electrode pad 144*a* to the electrode pad 146*a*. In addition, a voltage is applied between the electrode pad 144*b* and the electrode pad 146*b* to cause a current to flow from the electrode pad 146*b* to the electrode pad 144*b*.

Referring to FIG. 3, a rightward current flows in the first inner drive wiring portion 132*a* on the inner movable plate 112. The first inner drive wiring portion 132*a* is located in outward (upward) magnetic lines of force, and hence receives the upward Lorentz force in the direction perpendicular to the drawing surface.

Referring to FIG. 3, a rightward current flows in the second inner drive wiring portion 132*b* on the inner movable plate 112. The second inner drive wiring portion 132*b* is located in outward (downward) magnetic lines of force, and hence receives the downward Lorentz force in the direction perpendicular to the drawing surface.

The inner movable plate 112 therefore receives a couple of forces about the first axis A1, and the inner torsion bars 114*a* and 114*b* twist. This causes the inner movable plate 112 to tilt about the first axis A1. The tilt angle of the inner movable plate 112 depends on the magnitudes of the currents flowing in the inner drive wiring portions 132*a* and 132*b*.

When the inner movable plate 112 is actuated, the Lorentz force as a force component that causes the outer movable plate 116 to tilt about the second axis A2 is generated in each of parts of the first inner extracted wiring portions 134*a* and 136*a* that are located on the outer movable plate 116. However, the Lorentz forces received by the first inner extracted wiring portions 134*a* and 136*a* cancel out each other, so that the forces do not contribute to the tilting of the outer movable plate 116.

More specifically, part of the first inner extracted wiring portion 134*a* that is located on the outer movable plate 116 and extends parallel to the second axis A2 receives the downward Lorentz force in the direction perpendicular to the drawing surface. In addition, part of the first inner extracted wiring portion 136*a* that is located on the outer movable plate 116 and extends parallel to the second axis A2 receives the downward Lorentz force in the direction perpendicular to the drawing surface. Since the magnitude of the current flowing in the first inner extracted wiring portion 134*a* is equal to that of the current flowing in the first inner extracted wiring portion 136*a*, the magnitude of the Lorentz force received by the first inner extracted wiring portion 134*a* is equal to the magnitude of the Lorentz force received by the first inner extracted wiring portion 136*a*.

The Lorentz force received by the first inner extracted wiring portion 134*a* and the Lorentz force received by the first inner extracted wiring portion 136*a* are both components that causes the outer movable plate 116 to tilt about the second axis A2. However, the two components make the outer movable plate 116 tilt in opposite directions. For this reason, the Lorentz force received by the first inner extracted wiring portion 134*a* and that received by the first inner extracted wiring portion 136*a* cancel out each other, and hence make substantially no contribution to the tilting of the outer movable plate 116 about the second axis A2.

This equally applies to the second inner extracted wiring portions 134*b* and 136*b*.

This makes it possible to independently control the tilting of the inner movable plate 112 about the first axis A1 and that about the second axis A2.

More preferably, the magnitude of the current flowing in the first inner wiring 130*a* is equal to the magnitude of the current flowing in the second inner wiring 130*b*. In this case, currents flow in opposite directions in two parts of the first inner extracted wiring portion 134*a* and second inner extracted wiring portion 134*b* that are located on the outer movable plate 116 and extend almost parallel to the second axis A2 (located relatively near each other on the left side on the outer movable plate 116). For this reason, the Lorentz forces generated in the respective portions by the interaction with magnetic fields cancel out each other. This also applies to the first inner extracted wiring portion 136*a* and second inner extracted wiring portion 136*b*. For this reason, the currents that flow in the inner wirings 130*a* and 130*b* for tilting the inner movable plate 112 have no influence on the tilting of the outer movable plate 116. This makes it possible to independently control the tilting of the inner movable plate 112 about the first axis A1 and that about the second axis A2.

The two-dimensional optical deflector 100 of this embodiment can therefore realize almost completely independent control on the tilting of the inner movable plate 112 about the first axis A1 and that about the second axis A2.

When, for example, the two-dimensional optical deflector 100 is to be used to scan a light beam, AC voltages are applied between the electrode pads 164*a* and 166*a* and between the electrode pads 164*b* and 166*b* to make in-phase AC currents flow in the outer wirings 150*a* and 150*b*. In this case, since the magnitudes of the currents flowing in the first outer drive wiring portions 152*a* and 152*b* periodically change, the tilt angle of the outer movable plate 116 about the second axis A2 repeatedly changes. That is, the outer movable plate 116 is rocked about the second axis A2. In addition, AC voltages are applied between the electrode pads 144*a* and 146*a* and between the electrode pads 144*b* and 146*b* to make AC currents flow in the inner wirings 130*a* and 130*b*. In this case, since the magnitudes of the currents flowing in the inner drive wiring portions 132*a* and 132*b* periodically change, the tilt angle of the inner movable plate 112 about the first axis A1 repeatedly changes. That is, the inner movable plate 112 is rocked about the first axis A1. As a consequence, the light beam reflected by the reflecting surface 122 of the inner movable plate 112 is two-dimensionally scanned.

When the two-dimensional optical deflector 100 is to be used to deflect a light beam in a predetermined direction, constant voltages are applied between the electrode pads 164*a* and 166*b* and between the electrode pads 164*b* and 166*b* to make DC currents flow in the same direction in the outer wirings 150*a* and 150*b*. In this case, since the magnitudes of the currents flowing in the outer drive wiring portions 152*a* and 152*b* are constant, the outer movable plate 116 tilts about the second axis A2 by a predetermined angle. That is, the outer movable plate 116 is deflected about the second axis A2. In addition, DC voltages are applied between the electrode pads 144*a* and 146*a* and between the electrode pads 144*b* and 146*b* to make DC currents flow in the inner wirings 130*a* and 130*b*. In this case, since the magnitudes of the currents flowing in the inner drive wiring portions 132*a* and 132*b* are constant, the inner movable plate 112 tilts about the first axis A1 by a predetermined angle. That is, the inner movable plate 112 is deflected about the first axis A1. As a consequence, the light beam reflected by the reflecting surface 122 of the inner movable plate 112 is deflected in a predetermined direction.

As is obvious from the above description, the two-dimensional optical deflector 100 of this embodiment can make almost completely independent control on the rocking and deflection of the inner movable plate 112 having the reflecting surface about the first axis A1 and second axis A2.

In addition, since the drive wiring portions 132a, 132b, 152a, and 152b are arranged in the regions where the magnetic flux densities are high, and the magnetic lines of forces generated by the magnet unit 170 cross the drive wiring portions 132a, 132b, 152a, and 152b at right angles regardless of their positions, the actuation efficiency is high, and the power consumption is low.

According to the above description, currents of the same magnitude are made to flow in the two inner wirings 130a and 130b. However, it is not always necessary to make currents of the same magnitude flow in these wirings. The magnitudes of currents to be made to flow in the two inner wirings 130a and 130b may differ within the range in which the operation characteristics required for the two-dimensional optical deflector 100 are satisfied. In order to realize independent control suitable for rocking about the first axis A1 and second axis A2, the magnitudes of currents to be made to flow in the two inner wirings 130a and 130b are preferably equal to each other.

In this embodiment, each of the inner wirings 130a and 130b makes a half turn on the inner movable plate 112. However, each wiring may make more turns. Likewise, each of the outer wirings 150a and 150b makes a half turn on the outer movable plate 116. However, each wiring may make more turns.

Second Embodiment

Figure 5:
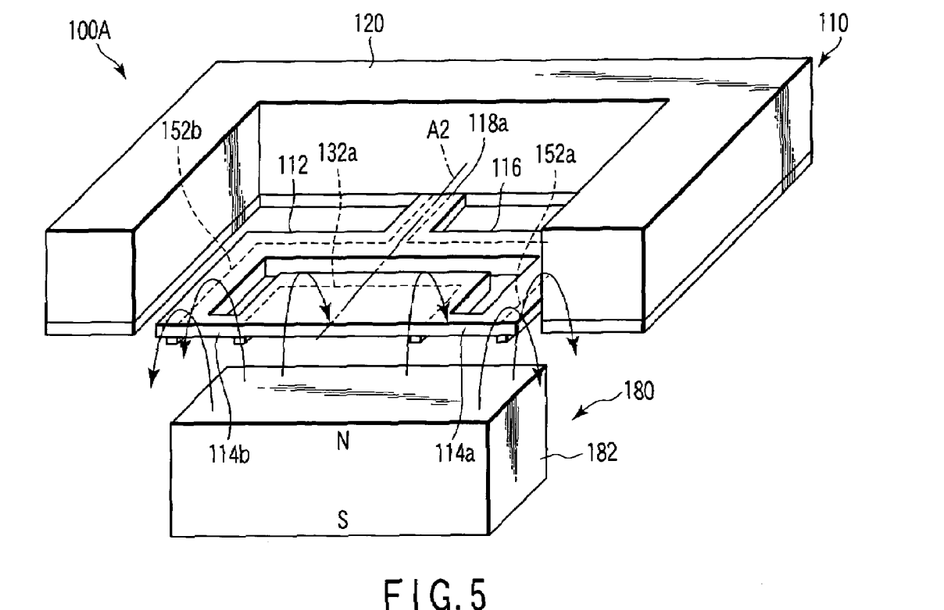
FIG. 5 is a sectional perspective view of an optical deflector according to the second embodiment of the present invention.
Figure 6:
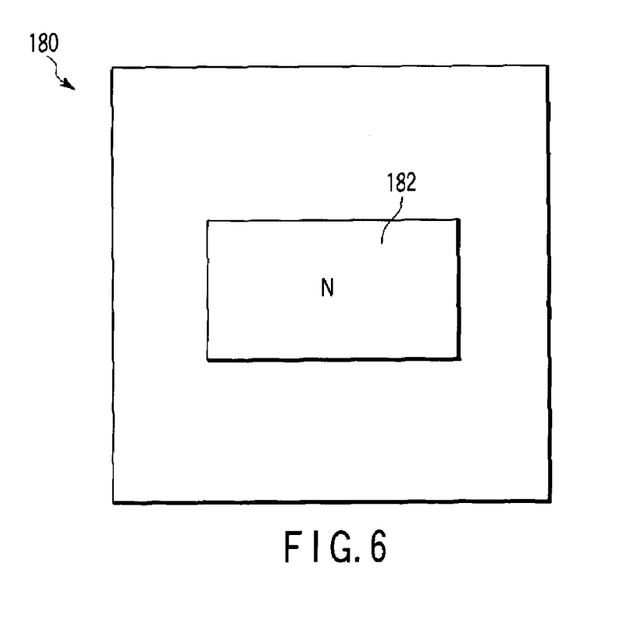
FIG. 6 is a plan view of the magnet unit shown in FIG. 5.
Figures 7, 8, 10:
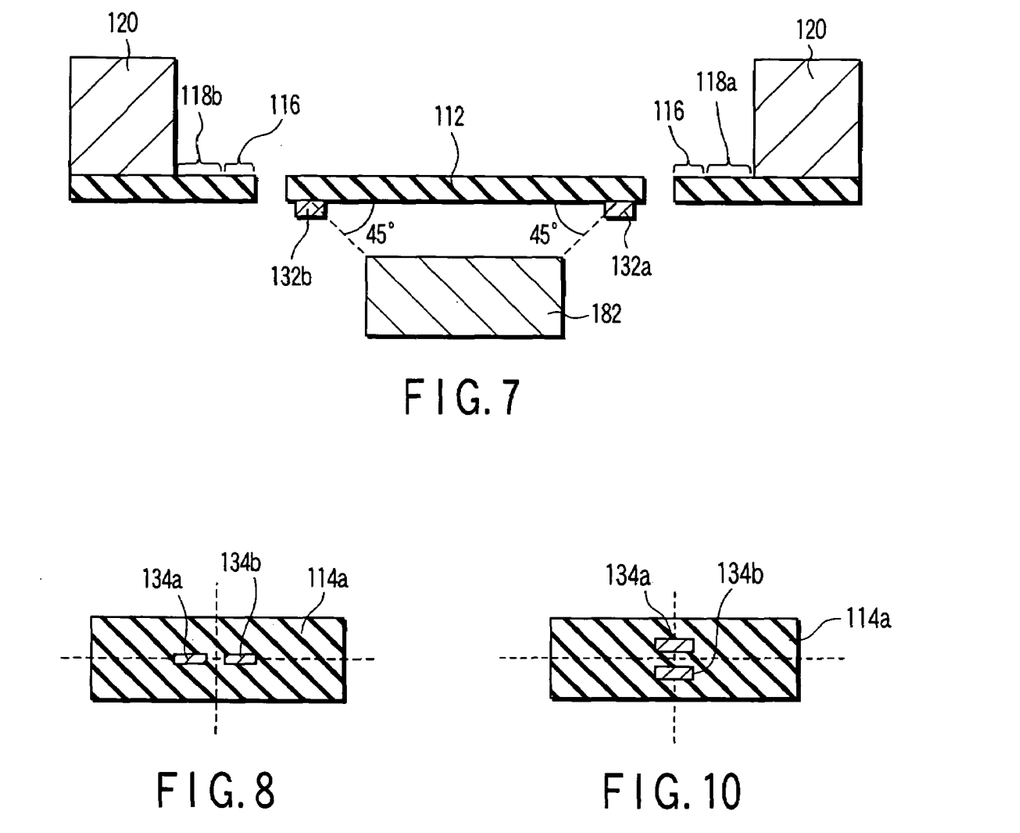
FIG. 7 is a sectional view taken along the second axis of the optical deflector shown in FIG. 5.
FIG. 8 is a sectional view of the first inner torsion bar taken along a plane perpendicular to the first axis in a two-dimensional optical deflector according to the third embodiment of the present invention.
FIG. 10 is a sectional view of the first inner torsion bar taken along a plane perpendicular to the first axis in a modification to the two-dimensional optical deflector according to the third embodiment of the present invention.

This embodiment is directed to another two-dimensional optical deflector. FIG. 5 is a sectional perspective view of the optical deflector according to the second embodiment of the present invention. FIG. 6 is a plan view of a magnet unit in FIG. 5. FIG. 7 is a sectional view taken along a second axis A2 of the optical deflector shown in FIG. 5.

The optical deflector of this embodiment differs from that of the first embodiment only in the arrangement of the magnet unit.

As shown in FIG. 5, a two-dimensional optical deflector 100A of this embodiment includes a movable plate unit 110 and magnet unit 180. The movable plate unit 110 is identical to that in the first embodiment. The magnet unit 180 has only one magnet 182 located at the center, as shown in FIGS. 5 and 6. The magnet 182 has an N pole on the side facing the movable plate unit 110. The magnet 182 has a rectangular parallelepiped shape.

As shown in FIG. 5, the movable plate unit 110 and magnet unit 180 are arranged at a predetermined interval. The inner drive wiring portions 132a and 132b extend almost parallel to the edges of the magnet 182 along a first axis A1, respectively. Although not shown in FIG. 5, the positional relationship between the above portions can easily be understood by referring to FIGS. 3 and 6. The outer drive wiring portions 152a and 152b extend almost parallel to the edges of the magnet 182 along the second axis A2, respectively.

Both the inner drive wiring portions 132a and 132b are located outside the magnet 182 along the second axis A2 rather than immediately above the edges of the magnet 182. Likewise, both the outer drive wiring portions 152a and 152b are located outside the magnet 182 along the first axis A1 rather than immediately above the edges of the magnet 182.

As shown in, for example, FIG. 7, each of the inner drive wiring portions 132a and 132b is located outside the edges of the magnet 182 at a position obliquely above it at an angle of 45° on a cross-section that passes through the second axis A2 and is perpendicular to the first axis A1. In this arrangement relationship, magnetic lines of force crossing the inner drive wiring portions 132a and 132b become relatively parallel to a plane including the first axis A1 and second axis A2.

Although not shown specifically, the same applies to the outer drive wiring portions 152a and 152b.

According to the two-dimensional optical deflector 100A of this embodiment, since the magnet unit 180 comprises only one magnet 182, a reduction in manufacturing cost can be achieved. This includes simplification of manufacturing steps owing to the elimination of the necessity to bond magnets unlike in the first embodiment.

Third Embodiment

This embodiment is directed to a modification to the wirings in the two-dimensional optical deflector according to the first embodiment. A two-dimensional optical deflector according to this embodiment differs from the first embodiment only in the arrangement of wirings. The remaining arrangements of this embodiment are the same as those of the first embodiment.

Figure 9:
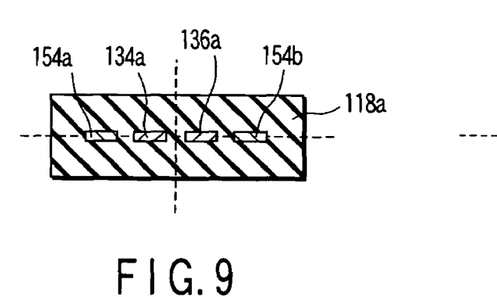
FIG. 9 is a sectional view of the first outer torsion bar taken along a plane perpendicular to the second axis in the two-dimensional optical deflector according to the third embodiment of the present invention.

FIG. 8 is a sectional view of the first inner torsion bar taken along a plane perpendicular to the first axis A1 in the two-dimensional optical deflector according to the third embodiment of the present invention. FIG. 9 is a sectional view of the first outer torsion bar taken along a plane perpendicular to the second axis A2 in the two-dimensional optical deflector according to the third embodiment of the present invention.

In this embodiment, as shown in FIG. 8, both portions of a first inner wiring 130a (i.e., two first inner extracted wiring portions 134a and 136a) extending on a first inner torsion bar 114a pass through near the central axis of the first inner torsion bar 114a, i.e., the first axis A1, and are almost located on a plane including the first axis A1 and a second axis A2. Although not specifically shown, a second inner torsion bar 114b has the same arrangement.

As shown in FIG. 9, both parts of the first inner wiring 130a (i.e., the two first inner extracted wiring portions 134a and 136a) and the portions of a first outer wiring 150a (i.e., two first outer extracted wiring portions 154a and 156a) that extend on a first outer torsion bar 118a pass through near the central axis of the first inner torsion bar 114a, i.e., the second axis A2, and are almost located on a plane including the first axis A1 and second axis A2. Although not specifically shown, a second outer torsion bar 118b has the same arrangement.

In this embodiment, the first inner extracted wiring portions 134a and 136a pass through the interiors of the inner torsion bars 114a and 114b at positions near their centers, and the first inner extracted wiring portions 134a and 136a and the first outer extracted wiring portions 154a and 156a pass through the interiors of the outer torsion bars 118a and 118b at positions near their centers. For this reason, the inner torsion bars 114a and 114b and outer torsion bars 118a and 118b comprise films of material suitable for allowing wirings to pass within it, for example, polyimide films.

In this embodiment, the inner wiring 130a and an inner wiring 130b pass through parts of the inner torsion bars 114a and 114b and outer torsion bars 118a and 118b in which the occurrence of torsional distortion is relatively low. Likewise, the outer wiring 150a and an outer wiring 150b pass through parts of the outer torsion bars 118a and 118b in which the occurrence of torsional distortion is relatively low.

This therefore reduces the occurrence of disconnection of the inner wirings 130a and 130b and outer wirings 150a and 150b due to the torsional distortion of the inner torsion bars 114a and 114b and outer torsion bars 118a and 118b. As a consequence, there is provided a two-dimensional optical deflector that is less susceptible to failure.

In this embodiment, as shown in FIG. 8, the two first inner extracted wiring portions 134a and 134b are formed in the same plane. However, the present invention is not limited to this. For example, as shown in FIG. 10, the two first inner extracted wiring portions 134a and 134b may be arranged inside the first inner torsion bar 114a at an interval in the vertical direction, i.e., at an interval in a direction perpendicular to a plane including the first axis A1 and second axis A2.

Figure 11:
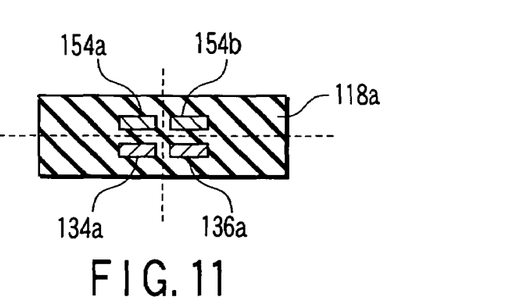
FIG. 11 is a sectional view of the first outer torsion bar taken along a plane perpendicular to the second axis in the modification to the two-dimensional optical deflector according to the third embodiment of the present invention.

In addition, in this embodiment, as shown in FIG. 9, both the first inner extracted wiring portions 134a and 136a and the first outer extracted wiring portions 154a and 156a are formed in the same plane. However, the present invention is not limited to this. For example, as shown in FIG. 11, the first inner extracted wiring portions 134a and 136a and first outer extracted wiring portions 154a and 156a may be arranged inside the first outer torsion bar 118a at intervals in the vertical direction, i.e., at intervals in a direction perpendicular to a plane including the first axis A1 and second axis A2.

Fourth Embodiment

Figure 12:
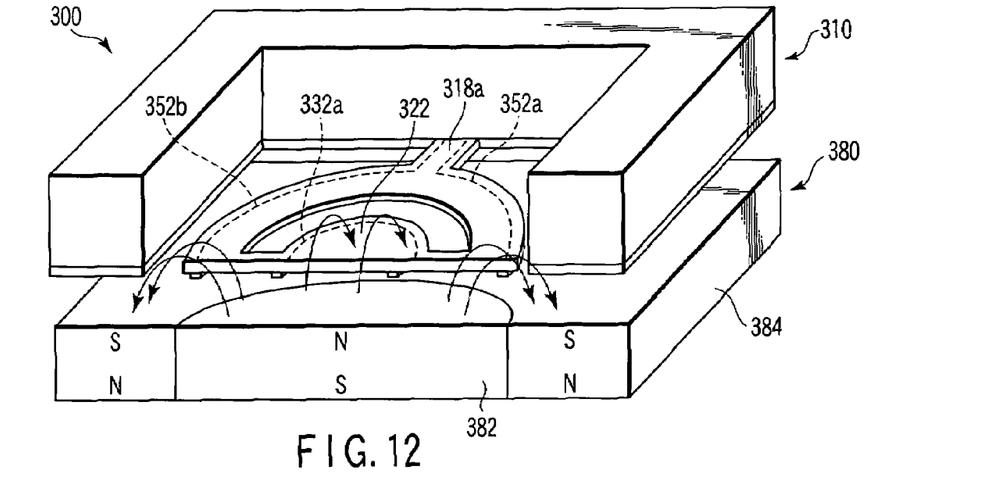
FIG. 12 is a sectional perspective view of an optical deflector according to the fourth embodiment of the present invention.
Figure 13:
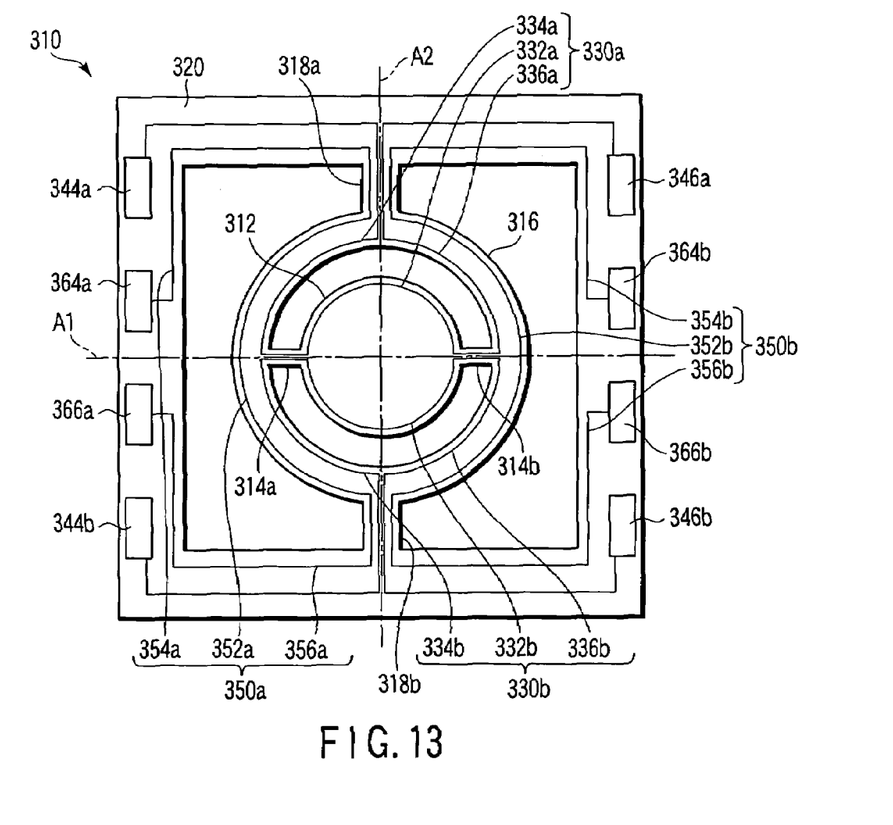
FIG. 13 is a plan view of the movable plate unit shown in FIG. 12.
Figure 14:
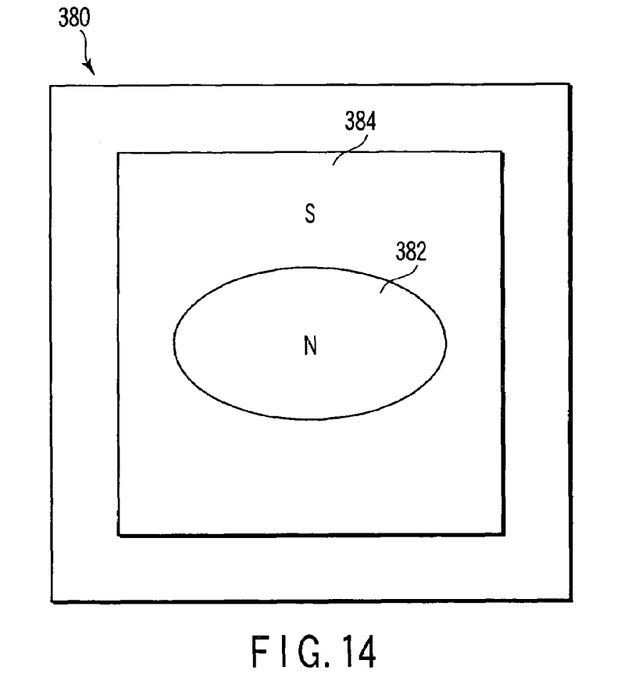
FIG. 14 is a plan view of the magnet unit shown in FIG. 12.

This embodiment is directed to another two-dimensional optical deflector. FIG. 12 is a sectional perspective view of an optical deflector according to the fourth embodiment. FIG. 13 is a plan view of the movable plate unit shown in FIG. 12. FIG. 14 is a plane view of the magnet unit shown in FIG. 12.

As shown in FIG. 12, a two-dimensional optical deflector 300 of this embodiment includes a movable plate units 310 and magnet unit 380. The movable plate units 310 and magnet unit 380 are arranged at a predetermined interval, and the movable plate units 310 is located within the magnetic field generated by the magnet unit 380.

As shown in FIGS. 12 and 13, the movable plate units 310 includes an inner movable plate 312 in the form of a circular plate, an outer movable plate 316 in the form of a circular frame, which is located outside the inner movable plate 312, two inner torsion bars (first inner torsion bar 314a and second inner torsion bar 314b) connecting the inner movable plate 312 and the outer movable plate 316, a support 320 in the form of a rectangular frame, which is located outside the outer movable plate 316, and two outer torsion bars (first outer torsion bar 318a and second outer torsion bar 318b) connecting the outer movable plate 316 and the support 320.

As shown in FIG. 12, the inner movable plate 312 has, on its upper surface, a reflecting surface 322 for reflecting light.

As shown in FIGS. 12 and 13, both the two inner torsion bars 314a and 314b extend on an almost straight line along a first axis A1. The two outer torsion bars 318a and 318b extend on an almost straight line along a second axis A2. The first axis A1 and second axis A2 are almost perpendicular to each other.

The outer peripheral shape of the inner movable plate 312 is circular when viewed from above, and two central axes of the circle, which are perpendicular to each other, are parallel to the first axis A1 and second axis A2, respectively. The outer peripheral shape of the outer movable plate 316 is also circular when viewed from above, and two central axes of the circle, which are perpendicular to each other, are also parallel to the first axis A1 and second axis A2.

The outer peripheral shape of the inner movable plate 312 may be elliptic. In this case, the two central axes (the major and minor axes of the ellipse) of the ellipse, which are perpendicular to each other, are preferably parallel to the first and second axes A1 and A2, respectively. The outer peripheral shape of the outer movable plate 316 may be elliptic. In this case, the two central axes (the major and minor axes of the ellipse) of the ellipse, which are perpendicular to each other, are preferably parallel to the first and second axes A1 and A2, respectively.

In other words, if a circle is regarded as an ellipse in a broad sense, both the outer peripheral shape of the inner movable plate 312 and that of the outer movable plate 316 are elliptic.

The outer torsion bars 318a and 318b are capable of twisting and distorting about the second axis A2, thereby enabling the outer movable plate 316 to tilt about the second axis A2 with respect to the support 320. The inner torsion bars 314a and 314b are capable of twisting and distorting about the first axis A1, thereby enabling the inner movable plate 312 to tilt about the first axis A1 with respect to the outer movable plate 316.

This makes it possible to two-dimensionally change the direction of the reflecting surface 322 of the inner movable plate 312. The two-dimensional optical deflector 300 can therefore two-dimensionally deflect the light beam reflected by the reflecting surface 322.

As shown in FIG. 13, the movable plate units 310 further includes two inner wirings (first inner wiring 330a and second inner wiring 330b) extending on the inner movable plate 312, inner torsion bars 314a and 314b, outer movable plate 316, outer torsion bars 318a and 318b, and support 320. The first inner wiring 330a includes a first inner drive wiring portion 332a and two first inner extracted wiring portions 334a and 336a extending from the two ends of the first inner drive wiring portion 332a, respectively. Likewise, the second inner wiring 330b includes a second inner drive wiring portion 332b and two second inner extracted wiring portions 334b and 336b extending from the two ends of the second inner drive wiring portion 332b.

In this case, the inner drive wiring portions 332a and 332b are parts of the inner wirings 330a and 330b that extend along by the periphery of the inner movable plate 312. The first inner extracted wiring portions 334a and 336a are parts of the first inner wiring 330a that exclude the first inner drive wiring portion 332a. Likewise, the second inner extracted wiring portions 334b and 336b are parts of the second inner wiring 330b that exclude the second inner drive wiring portion 332b.

As is obvious from FIG. 13, the first inner drive wiring portion 332a and second inner drive wiring portion 332b are located almost line-symmetrically with respect to the first axis A1.

Referring to FIG. 13, the first extracted wiring portion 334a extending from the left end portion of the first inner drive wiring portion 332a on the upper side passes through the first inner torsion bar 314a on the left side, extends upward along by the inner periphery of the outer movable plate 316, passes through the first outer torsion bar 318a on the upper side, extends to the left on a support 320, and terminates at a electrode pad 344a provided on the support 320.

The first extracted wiring portion 336a extending from the right end portion of the first inner drive wiring portion 332a passes through the second inner torsion bar 314b on the right side, extends upward along by the inner periphery of the outer movable plate 316, passes through the first outer torsion bar 318a on the upper side, extends to the right on the support 320, and terminates at an electrode pad 346a provided on the support 320.

As is obvious from FIG. 13, the first extracted wiring portion 334a and first extracted wiring portion 336a are located almost line-symmetrically with respect to the second axis A2.

The second extracted wiring portion 334b extending from the left end portion of the second inner drive wiring portion 332b on the lower side passes through the first inner torsion bar 314a on the left side, extends downward along by the inner periphery of the outer movable plate 316, passes through the second outer torsion bar 318b on the lower side, extends to the left on the support 320, and terminates at an electrode pad 344b provided on the support 320.

The second extracted wiring portion 336b extending from the right end portion of the second inner drive wiring portion 332b passes through the second inner torsion bar 314b on the right side, extends downward along by the inner periphery of the outer movable plate 316, passes through the second outer torsion bar 318b on the lower side, extends to the right on the support 320, and terminates at an electrode pad 346b provided on the support 320.

As is obvious from FIG. 13, the second extracted wiring portion 334b and second extracted wiring portion 336b are located almost line-symmetrically with respect to the second axis A2.

The movable plate units 310 further includes two outer wirings (first outer wiring 350a and second outer wiring 350b) extending on the outer movable plate 316, outer torsion bars 318a and 318b, and support 320. The first outer wiring 350a includes a first outer drive wiring portion 352a and two first outer extracted wiring portions 354a and 356a extending from the two ends of the first outer drive wiring portion 352a, respectively. Likewise, the second outer wiring 350b includes a second outer drive wiring portion 352b and two second outer extracted wiring portions 354b and 356b extending from the two ends of the second outer drive wiring portion 352b, respectively.

In this case, the outer drive wiring portions 352a and 352b are parts of the outer wirings 350a and 350b that extend along by the periphery of the outer movable plate 316. The first outer extracted wiring portions 354a and 356a are parts of the first outer wiring 350a that exclude the first outer drive wiring portion 352a. Likewise, the second outer extracted wiring portions 354b and 356b are parts of the second outer wiring 350b that exclude the second outer drive wiring portion 352b.

As is obvious from FIG. 13, the first outer drive wiring portion 352a and second outer drive wiring portion 352b are located almost line-symmetrically with respect to the second axis A2.

Referring to FIG. 3, the first outer extracted wiring portion 354a extending from the upper end portion of the first outer drive wiring portion 352a on the left side passes through the first outer torsion bar 318a on the upper side, extends to the left on the support 320, and terminates at an electrode pad 364a provided on the support 320.

The first outer extracted wiring portion 356a extending from the lower end portion of the first outer drive wiring portion 352a passes through the second outer torsion bar 318b on the lower side, extends to the left on the support 320, and terminates at an electrode pad 366a provided on the support 320.

As is obvious from FIG. 13, the first outer extracted wiring portion 354a and first outer extracted wiring portion 356a are located almost line-symmetrically with respect to the first axis A1.

The second outer extracted wiring portion 354b extending from the upper end portion of the second outer drive wiring portion 352b on the right side passes through the first outer torsion bar 318a on the upper side, extends to the right on the support 320, and terminates at an electrode pad 364b provided on the support 320.

The second outer extracted wiring portion 356b extending from the lower end portion of the second outer drive wiring portion 352b passes through the second outer torsion bar 318b on the lower side, extends to the right on the support 320, and terminates at an electrode pad 366b provided on the support 320.

As is obvious from FIG. 13, the second outer extracted wiring portion 354b and second outer extracted wiring portion 356b are located almost line-symmetrically with respect to the first axis A1.

Although not specifically shown, the wirings 330a, 330b, 350a, and 350b are covered with isolation film such as silicon oxide film for electric isolation.

As shown in FIG. 14, the magnet unit 380 includes a magnet 382 located at the center and a magnet 384 surrounding the magnet 382. The magnet 382 has an N pole on the side facing the movable plate units 310, and the magnet 384 has an S pole on the side facing the movable plate units 310. That is, the magnets 382 and 384 are opposite in magnetic polarity direction. The magnet 382 has an elliptic cylindrical shape. The magnet 384 has a through hole in which the magnet 382 is fitted. The magnet 382 is placed in this though hole. Therefore, the outer peripheral shape of the magnet 382 is elliptic when viewed from the above.

Parts of the boundary between the magnets 382 and 384 that extend along the minor axis of the elliptic shape of the magnet 382 are located almost immediately below the inner drive wiring portions 332a and 332b, respectively. In addition, parts of the boundary between the magnets 382 and 384 that extend along the major axis of the elliptic shape of the magnet 382 are located almost immediately below the outer drive wiring portions 352a and 352b, respectively.

The magnetic flux density near the boundary between the magnets 382 and 384, which are opposite in magnetic polarity direction, is high. For this reason, both portions near the middles of the inner drive wiring portions 332a and 332b (portions relatively near the second axis A2) and portions near the middles of the outer drive wiring portions 352a and 352b (portions relatively near the first axis A1) are located in regions where the magnetic flux densities are high.

As shown in FIG. 12, the magnetic lines of force flowing from the magnet 382 to the magnet 384 cross the portions near the middles of the inner drive wiring portions 332a and 332b and the portions near the middles of the outer drive wiring portions 352a and 352b at almost right angles.

In this embodiment, the inner movable plate 312 is actuated about the first axis A1 in the same manner as in the first embodiment except that the magnitudes of Lorentz forces received by the inner drive wiring portions 332a and 332b when currents flow in the inner wirings 330a and 330b depend on positions. The Lorentz force forces received by the inner drive wiring portions 332a and 332b are highest near the middles of the wiring portions, and the Lorentz forces received by parts of the inner drive wiring portions 332a and 332b that are near their middles contribute most to the actuation of the inner movable plate 312.

In addition, the outer movable plate 316 is actuated about the second axis A2 in the same manner as in the first embodiment except that the magnitudes of Lorentz forces received by the outer drive wiring portions 352a and 352b when currents flow in the outer wirings 350a and 350b depend on positions. The Lorentz force forces received by the outer drive wiring portions 352a and 352b are highest near the middles of the wiring portions, and the Lorentz forces received by parts of the outer drive wiring portions 352a and 352b that are near their middles contribute most to the actuation of the outer movable plate 316.

In the two-dimensional optical deflector 300 of this embodiment, since the inner movable plate 312 is in the form of a circular plate, its inertia moment is smaller than that of a movable plate in the form of a rectangular plate (i.e., the inner movable plate 112 in the first embodiment). In addition, since the outer movable plate 316 is in the form of a circular frame, its inertia moment is smaller than that of a movable plate in the form of a rectangular frame (i.e., the outer movable plate 116 in the first embodiment). This allows the spring stiffness of the inner torsion bars 314a and 314b and outer torsion bars 318a and 318b to be reduced with the resonant frequency maintained, so that actuating operation with small currents, i.e., a reduction in power consumption is realized.

In this embodiment, each of the inner wirings 330a and 330b makes a half turn on the inner movable plate 312. However, each wiring may make more turns. Likewise, each of the outer wirings 350a and 350b makes a half turn on the outer movable plate 316. However, each wiring may make more turns.

Although the embodiments of the present invention have been described with reference to the views of the accompanying drawing, the present invention is not limited to these embodiments, and various modifications and changes thereof can be made within the spirit and scope of the invention.

Each embodiment described above is directed to a two-dimensional unit optical deflector. However, such deflectors may be properly arranged into an array.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electromagnetically actuated optical deflector comprising:
    a magnet unit, which generates a magnetic field; and
    a movable plate unit, which is placed in the magnetic field, the movable plate unit having an inner movable plate having a reflecting surface, an outer movable plate located outside the inner movable plate, two inner torsion bars connecting the inner movable plate and the outer movable plate, a support located outside the outer movable plate, and two outer torsion bars connecting the outer movable plate and the support, the inner torsion bars extending along a first axis and being capable of twisting about the first axis so as to allow the inner movable plate to tilt about the first axis with respect to the outer movable plate, the outer torsion bars extending along a second axis perpendicular to the first axis and being capable of twisting about the second axis so as to allow the outer movable plate to tilt about the second axis with respect to the support, the movable plate unit further having two inner wirings extending on the inner movable plate, the inner torsion bars, the outer movable plate, the outer torsion bars, and the support, the two inner wirings being provided independently of each other so as to be electrically isolated from each other, one of the inner wirings passing through one of the outer torsion bars, the other of the inner wirings passing through the other of the outer torsion bars, each of the two inner wirings having an inner drive wiring portion that extends along by a periphery of the inner movable plate, and two inner extracted wiring portions extending from two ends of the inner drive wiring portion, the two inner drive wiring portions being located substantially line-symmetrically with respect to the first axis, and the two inner extracted wiring portions extending from the two ends of each of the inner drive wiring portions being located substantially line-symmetrically with respect to the second axis, and currents of the same direction being applied to the two inner drive wiring portions along the first axis.

2. A deflector according to claim 1, wherein an outer peripheral shape of the inner movable plate is a rectangular shape, two central axes of the rectangular shape, which are perpendicular to each other, are parallel to the first axis and the second axis, respectively.

3. A deflector according to claim 1, wherein an outer peripheral shape of the inner movable plate is an elliptic shape (including a circular shape), and two central axes of the elliptic shape, which are perpendicular to each other, are parallel to the first axis and the second axis, respectively.

4. A deflector according to claim 1, wherein the movable plate unit further has two outer wirings extending on the outer movable plate, the outer torsion bars, and the support, both the two outer wirings passing through the two outer torsion bars, each of the two outer wirings having an outer drive wiring portion that extends along by a periphery of the outer movable plate, and two outer extracted wiring portions extending from two ends of the outer drive wiring portion, the two outer drive wiring portions being located substantially line-symmetrically with respect to the second axis, and the two outer extracted wiring portions extending from the two ends of each of the outer drive wiring portions being located substantially line-symmetrically with respect to the first axis, and currents of the same direction being applied to the two outer drive wiring portions.

5. A deflector according to claim 4, wherein an outer peripheral shape of the outer movable plate is a rectangular shape, and two central axes of the rectangular shape, which are perpendicular to each other, are parallel to the first axis and the second axis, respectively.

6. A deflector according to claim 4, wherein an outer peripheral shape of the outer movable plate is an elliptic shape (including a circular shape), and two central axes of the elliptic shape, which are perpendicular to each other, are parallel to the first axis and the second axis, respectively.

7. A deflector according to claim 1, wherein currents of the same magnitude flow in the two inner wirings.

8. An electromagnetically actuated optical deflector comprising:
    a magnet unit, which generates a magnetic field; and
    a movable plate unit, which is placed in the magnetic field, the movable plate unit having an inner movable plate having a reflecting surface, an outer movable plate located outside the inner movable plate, two inner torsion bars connecting the inner movable plate and the outer movable plate, a support located outside the outer movable plate, and two outer torsion bars connecting the outer movable elate and the support, the inner torsion bars extending along a first axis and being capable of twisting about the first axis so as to allow the inner movable plate to tilt about the first axis with respect to the outer movable plate, the outer torsion bars extending along a second axis perpendicular to the first axis and being capable of twisting about the second axis so as to allow the outer movable plate to tilt about the second axis with respect to the support, the movable plate unit further having two inner wirings extending on the inner movable plate, the inner torsion bars, the outer movable plate, the outer torsion bars, and the support, one of the inner wirings passing through one of the outer torsion bars, the other of the inner wirings passing through the other of the outer torsion bars, each of the two inner wirings having an inner drive wiring portion that extends along by a periphery of the inner movable plate, and two inner extracted wiring portions extending from two ends of the inner drive wiring portion, the two inner drive wiring portions being located substantially line-symmetrically with respect to the first axis, and the two inner extracted wiring portions extending from the two ends of each of the inner drive wiring portions being located substantially line-symmetrically with respect to the second axis, and currents of the same direction being applied to the two inner drive wiring portions;

wherein both the two inner extracted wiring portions extending on the inner torsion bars pass through near the first axis and are substantially located on a plane including the first axis and the second axis, and both the two inner extracted wiring portions and the two outer extracted wiring portions extending on the outer torsion bars pass through near the second axis and are substantially located on a plane including the first axis and the second axis.

9. An electromagnetically actuated optical deflector comprising:

a magnet unit, which generates a magnetic field; and a movable plate unit, which is placed in the magnetic field, the movable plate unit having an inner movable plate having a reflecting surface, an outer movable elate located outside the inner movable plate, two inner torsion bars connecting the inner movable plate and the outer movable plate, a support located outside the outer movable plate, and two outer torsion bars connecting the outer movable plate and the support, the inner torsion bars extending along a first axis and being capable of twisting about the first axis so as to allow the inner movable plate to tilt about the first axis with respect to the outer movable plate, the outer torsion bars extending along a second axis perpendicular to the first axis and being capable of twisting about the second axis so as to allow the outer movable plate to tilt about the second axis with respect to the support, the movable plate unit further having two inner wirings extending on the inner movable plate, the inner torsion bars, the outer movable plate, the outer torsion bars, and the support, one of the inner wirings passing through one of the outer torsion bars, the other of the inner wirings passing through the other of the outer torsion bars, each of the two inner wirings having an inner drive wiring portion that extends along by a periphery of the inner movable plate, and two inner extracted wiring portions extending from two ends of the inner drive wiring portion, the two inner drive wiring portions being located substantially line-symmetrically with respect to the first axis, and the two inner extracted wiring portions extending from the two ends of each of the inner drive wiring portions being located substantially line-symmetrically with respect to the second axis, and currents of the same direction being applied to the two inner drive wiring portions;

wherein both the two inner extracted wiring portions extending on the inner torsion bars pass near the first axis and extend at an interval in a direction perpendicular to a plane including the first axis and the second axis, and both the two inner extracted wiring portions and the two outer extracted wiring portions extending on the outer torsion bars pass through near the second axis and extend at intervals in a direction perpendicular to a plane including the first axis and the second axis.

10. A deflector according to claim 4, wherein the magnet unit has one magnet, one magnetic pole of the magnet faces the movable plate unit, the two inner drive wiring portions respectively extend substantially parallel to the edges of the magnet along the first axis, and the two outer drive wiring portions respectively extend substantially parallel to the edges of the magnet along the second axis.

11. A deflector according to claim 10, wherein both the two inner drive wiring portions are located outside the magnet along the second axis rather than immediately above the edges of the magnet, and the two outer drive wiring portions are located outside the magnet along the first axis rather than immediately above the edges of the magnet.

* * * * *